April 26, 1949.  W. T. SILVER  2,468,125
STANDING WAVE INDICATOR
Filed July 14, 1943
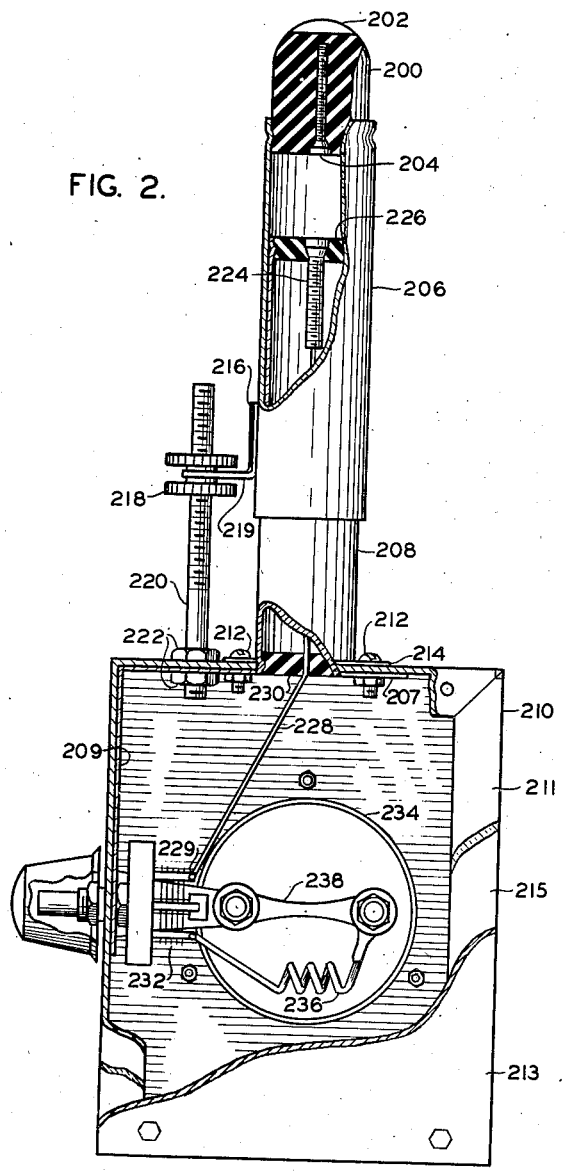
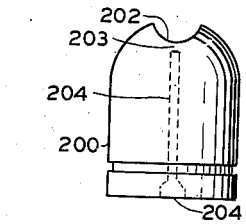
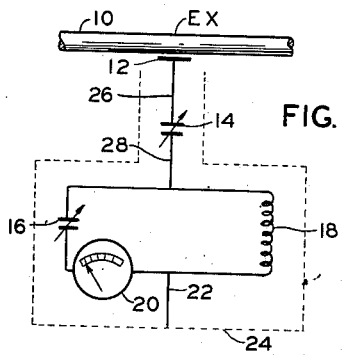
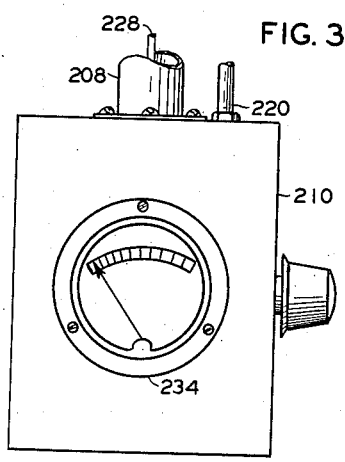
INVENTOR.
WALTER T. SILVER.
BY
*William D. Hall*
Attorney Patented Apr. 26, 1949

2,468,125

UNITED STATES PATENT OFFICE 2,468,125

STANDING WAVE INDICATOR

Walter T. Silver, Belmar, N. J., assignor to the United States of America as represented by the Secretary of War Application July 14, 1943, Serial No. 494,659

5 Claims. (Cl. 171—95)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a standing wave indicator, and more particularly to a standing wave indicator of the voltmeter type.

A standing wave indicator is a device which is used for indicating the presence of standing waves on high frequency transmission lines. When the transmission lines are not properly terminated, standing waves appear on the lines, and it becomes desirable to determine the proper adjustment of the terminating impedances by detecting the presence of the standing waves and their loops and nodes, by means of some instrument. This instrument may assume a form of a current indicator which shunts a small portion of the transmission line, the indicator being adapted to slide over the line. As the indicator slides over the line, the meter reading indicates the presence of loops and nodes of the standing waves. A more accurate indicator of the energy distribution over the line is an indicator of the voltmeter type. The indicators of this type are well-known in the art, and were first described by H. O. Roosenstein (Z. Hochfreq. 36,121, 1930). They ordinarily consist of a metallic probe, or a rod, which connects the indicator to the transmission line, the rod itself being connected through an isolating coupling condenser to a tuned circuit, and a meter mounted within a Faraday cage. The tuned circuit is connected on one side to the Faraday cage, and on the other side to the coupling condenser in the metallic probe.

In the prior art, the probe ordinarily makes a direct metallic contact with the transmission line. When the voltage carried by the transmission line is high, the direct metallic contact between the probe and the indicator may cause flashovers in the probe, or form mechanically and electrically unstable connections between the transmission line and the probe.

The invention resides in the electrical and mechanical improvements, rendering the voltmeter probe of the Roosenstein type more applicable to the measurement of voltage distribution along the transmission lines, and the use of such probe in connection with either high or low voltage transmission lines.

The invention eliminates the direct metallic contact between the probe and the transmission line and substitutes in its stead a condenser-type coupling between the probe and the line.

Moreover, when the voltmeter probes are used in connection with either high or low voltage transmission lines, it becomes desirable to interpose a variable coupling means between the transmission line and the probe, this variable coupling means enabling one to adjust the power impressed on the measuring circuit to the level required for proper operation of the D. C. milliammeter which is ordinarily used as the final indicator of the sought results. The invention discloses mechanically and electrically stable, durable, and convenient variable coupling affording wide variety of ranges and very fine and smooth degrees of adjustment.

It is, therefore, the principal object of this invention to provide a voltmeter type standing wave indicator for determining the voltage distribution over high frequency transmission lines which forms a stable mechanical and electrical connection between the probe and the transmission line.

Another object of this invention is to provide a voltage probe equipped with a variable coupling condenser between the tuned circuit of the indicator and the line, this condenser being equipped with a micrometer screw adjustment for obtaining a very wide range in the degree of coupling between the meter circuit and the line.

The novel features which I believe to be characteristic of my invention are set forth with particularity in the appended claims. The invention, however, both as to its organization and method of operation, together with the further objects and advantages thereof, may best be understood by reference to the following description taken in connection with the accompanying drawings in which:

Figure 1 is a schematic diagram of the indicator;

Figure 2 is a vertical elevational view of the indicator;

Figure 3 is an elevational view of a box which acts as a Faraday cage for the meter and the tuning condenser; and Figure 4 is an elevational view of an insulator head which makes direct contact with the transmission line when the indicator is in use.

Referring to Figure 1, the transmission line conductor 10 is connected to the probe by the coupling condenser 12, conductor 10 of the transmission line acting in this case as one plate of the coupling condenser. The lower plate of condenser 12 is connected over a conductor 26 to a variable condenser 14, the latter being connected over a conductor 28 to the tunable condenser-inductance combination 16—18. A thermo-couple meter 20 is connected in series with the tuned circuit, and a conductor 22 connects the tuned circuit to a Faraday cage 24 which houses the meter and its circuits.

The functioning of the circuit illustrated in Fig. 1 is based upon the fact that at a certain distance from the line 10 the potential gradient falls to zero, and the Faraday cage 24 is at that potential. The condenser 14 is used as a coupling device between the source of voltage to be measured and the tuned circuit. Since the space capacitance of the Faraday cage is large compared with the condenser 14, the potential of the test point $E_x$, Fig. 1, is $$E_x = \frac{I}{WC_{14}}$$

where I equals line current at point X, and $WC_{14}$ equals condensive reactance of the probe circuit. The setting of $C_{14}$ is chosen such that $$\frac{1}{2\pi}\sqrt{CL}$$

is larger than the frequency of the line current (C is condenser 16, and L is inductance 18). The meter circuit then acts as a condenser between the conductors 28 and 22. The above considerations apply to the circuit when conductor 26 makes a direct metallic contact with conductor 10. When condenser 12 is interposed between the conductors 10 and 26, the first equation must be modified by including the condensive reactance of condenser 12.

As mentioned previously in the specification, when conductor 26, Fig. 1, makes direct metallic contact with the transmission line conductor 10, and the probe is moved along conductor 10, the direct metallic contact, because of its mechanical instability, ordinarily forms a variable impedance connection between the probe and the transmission line producing unstable meter reading. Moreover, when the indicator is used in connection with high voltage transmission lines, a flash-over, or high leakage currents, may occur across condenser 14 which again results in the unstable meter readings. In order to avoid these difficulties, a voltage probe illustrated in Fig. 2 has been devised.

Referring now to Figs. 2 and 3, where the same elements have the same numerals, a rectangular box 210, made of magnetic material, houses a meter 234, a tuning condenser 232 and a fixed coil 236. The box is equipped with flanges 211, a metal cover 213, and an air-tight, moisture-proof gasket 215 between the flanges and the cover. An adjustable probe is mounted on top of box 210, the probe consisting of metal tubes 206, 208 in sliding engagement with respect to each other, an insulator head 200, and a micrometer screw 220 coupled to the outer tube 206 by means of a nut 218 and a fork 219. The top and the left side of box 210, Fig. 2, are copper lined with a continuous bent copper plate 207—209 which forms a low resistance path for the currents induced in the tubes 206, 208 and the micrometer screw 220.

The insulator head 200, which is also illustrated in Fig. 4, represents a cylindrical piece terminating at its upper end in a dome-shaped surface with a cylindrical groove 202 cut in the upper part of the dome. Axially mounted within the insulator head 200 is a set screw 204, the upper end of which terminates below groove 202, so that there is an insulator gap 203 between the surface of groove 202 and the upper end of set screw 204. Insulator 200, through its groove 202, forms direct contact with conductor 10, Fig. 1, when the probe is in use. When this is the case, conductor 10 forms one plate of the coupling condenser 12, and the upper end of the set screw 204 forms the other plate, the insulator gap 203 separating the two plates. Insulator head 200 is swaged onto the upper end of tube 206, the latter forming a sliding fit over tube 208. Tube 208 is mounted on the Faraday cage box 210 by means of bolts 212 and a flange 214. The micrometer screw 220 is also mounted on the Faraday cage 210 by means of nuts 222. This micrometer screw enables one to adjust conveniently the relative position of tube 206 with respect to tube 208. Centrally mounted within the tube 208 are a set screw 224 and a conductor 228, which are held in fixed position by means of insulators 226 and 230. Set screw 224 is soldered to conductor 228, the latter corresponding to conductor 28 in Fig. 1. The lower portion of conductor 228 forms a soldered connection 229 with one of the terminal posts of the tuning condenser 232, the latter corresponding to condenser 16 in Fig. 1. The thermocouple meter 20 and the fixed inductance coil 18, Fig. 1, appear at 234 and 236 respectively in Fig. 2. Meter 234 may be provided with a copper shunt 238. The heads of the set screws 204 and 224 form two plates of the variable air condenser 14, Fig. 1. When tube 206 is at its extreme lower position, i. e. when it envelopes tube 208, the distance between the heads of the set screws 204 and 224 is at a minimum, which corresponds to the maximum capacitance setting of condenser 14. When tube 206 is telescoped upward, the capacitive coupling between the line and the meter circuit is at a minimum.

From the above description of my invention it should be apparent to those skilled in the art that the invention provides convenient and stable coupling means between the transmission line and the probe, and equally convenient means for adjusting the degree of said coupling. The latter makes it possible to use the voltage probe either with high or low voltage transmission lines.

The degree of coupling between the line and the tuned circuit may be varied by adjusting the spacing between the set screws 204 and 224 by means of the micrometer screw 220 and nut 218. Groove 202 fits over the transmission line conductor, and forms mechanically and electrically stable connection with the conductor. The flashover and leakage currents are eliminated because of the insulative properties as well as the shape of insulator 200, and the voltage division between the two condensers 12 and 14 connected in series.

It is believed that the construction and operation of my standing wave indicator as well as the advantages thereof will be apparent from the foregoing description. It will, therefore, be apparent that while I have shown and described my invention in a preferred form, many changes and modifications may be made without departing from the spirit of the invention, as sought to be defined in the following claims.

I claim:

1. A standing wave indicator comprising a Faraday cage, a tunable condenser-inductance combination connected on one side to said cage, a meter connected in series with said inductance condenser combination, a probe mechanically connected to said Faraday cage, said probe including a first cylindrical tube, a conductor coaxially mounted within said first tube, one end of said conductor being connected to said condenser-inductance combination, and the other end of said conductor being connected to a plate of a second condenser, said plate being supported by an insulator at the outer end of said first tube, a second cylindrical tube mounted over and in a sliding engagement with said first tube, a micrometer screw fixedly attached to said Faraday cage on one side and adjustably attached to said second tube, said micrometer screw being capable of adjusting the relative longitudinal position of said second tube with respect to said first tube, an insulator head fitted into the outer end of said second tube, a groove cut in said insulator head for engaging a transmission line conductor when said indicator is in use, a coupling conductor mounted within said insulator head, and extending from the inner end of said head to a predetermined distance below the base of said groove whereby the outer end of said coupling is capacitively coupled to said transmission line conductor and the inner end forms the second plate of said second condenser.

2. A standing wave indicator for indicating voltage distribution on a high frequency transmission line conductor comprising a probe including an insulator head normally in contact with said line conductor when said indicator is in use, a coupling element mounted within said head and extending from the inner end of said head to a predetermined distance below the top of said head whereby the outer end of said element and said line conductor form a coupling condenser, a tunable circuit, a concentric line stub connected to said circuit, a second coupling condenser in said probe, one plate of said condenser being connected to the center conductor of said stub, and the other plate to the inner end of said coupling element, and adjustable mechanical connections between said stub and said head for varying the capacitance of said second condenser.

3. A standing wave indicator for indicating voltage distribution on a high frequency transmission line conductor comprising an insulator head normally in contact with said line conductor when said indicator is in use, a coupling element mounted within said head and extending from the inner end of said head to a predetermined distance below the top of said head whereby the outer end of said element and said line conductor form a coupling condenser, a metal box, a tunable circuit housed in and electrically connected to said box, an opening in said box, a concentric line stub protruding through said opening, the outer conductor of said stub being electrically connected to said box, and the inner conductor to said tuned circuit, and a variable air condenser, interconnecting said coupling element and said inner conductor, for regulating the voltage impressed on said tuned circuit.

4. A standing wave indicator for indicating voltage distribution on a high frequency transmission line conductor comprising an insulator head normally in contact with said line conductor when said indicator is in use, a coupling element mounted within said head and extending from the inner end of said head to a predetermined distance below the top of said head whereby the outer end of said element and said line conductor form a coupling condenser, a metal box; a tuned circuit, including a meter, mounted in said box; a concentric line stub protruding from said box and electrically connected across said tuned circuit, a variable air condenser connected with one plate to the inner conductor of said stub, and with the other plate to the inner end of said coupling element, a metal sleeve in sliding engagement with said stub and fastened with its outer end to said insulator head, and means for sliding said sleeve on said stub for varying the capacitance of said air condenser so as to confine the current flowing in said tuned circuit to the current range of said meter.

5. In combination, a standing wave indicator, a transmission line conductor carrying high frequency energy, a metallic housing for said indicator forming one terminal of said indicator, a probe electrically interconnecting said indicator and said conductor, said probe forming the other terminal for said indicator and comprising a first conductor, a second conductor, a variable air condenser interconnecting said first and second conductors, and a second dielectric condenser interconnecting said second conductor and said line conductor, said second condenser being so constructed and arranged that said line conductor forms one plate of said condenser when said indicator is in use, and the dielectric of said second condenser forms a mechanical guide for said indicator.

WALTER THEO. SILVER.

REFERENCES CITED

The following references are of record in the file of this patent:

UNITED STATES PATENTS

| Number | Name | Date |
| --- | --- | --- |
| 1,867,901 | Walter | July 19, 1932 |
| 2,191,271 | Carter | Feb. 20, 1940 |
| 2,242,874 | Usselman | May 20, 1941 |
| 2,267,539 | Thorne | Dec. 23, 1941 |